United States Patent [19]
Todd et al.

[11] Patent Number: 5,618,413
[45] Date of Patent: Apr. 8, 1997

[54] ECOLOGICAL FLUIDIZED BED SYSTEM

[75] Inventors: John H. Todd, Falmouth, Mass.; James M. Shaw, Shelburne, Vt.

[73] Assignee: Ocean Arks International, Inc., Falmouth, Mass.

[21] Appl. No.: 457,990

[22] Filed: Jun. 1, 1995

Related U.S. Application Data

[62] Division of Ser. No. 149,964, Nov. 10, 1993, Pat. No. 5,486,291.

[51] Int. Cl.⁶ .................................................. C02F 3/08
[52] U.S. Cl. .................... 210/151; 210/170; 210/195.1; 210/202; 210/242.2; 210/266
[58] Field of Search .................................. 210/602, 610, 210/617, 618, 629, 747, 150, 151, 170, 242.1, 242.2, 266, 283, 290, 195.1, 196, 197, 202, 258, 259

[56] References Cited

U.S. PATENT DOCUMENTS 3,563,888  2/1971  Klock ........................................ 210/617
4,415,450  11/1983  Wolverton ................................ 210/151
4,482,458  11/1984  Rovel et al. ............................. 210/617
5,087,353  2/1992  Todd et al. .............................. 210/151
5,228,998  7/1993  DiClemente et al. ................. 210/242.2

Primary Examiner—Ivars Cintins
Attorney, Agent, or Firm—Richard P. Crowley

[57] ABSTRACT

An ecological fluidized bed system and method for the processing of polluted water to provide treated water. The system comprises a fluidized bed container containing a layer of coarse media with a layer of fine media above it which has a buoyancy substantially similar to the polluted water, and particularly pumice rock having a high surface to volume ratio, an inlet to introduce water into the container, and an outlet to withdraw treated water, and either a mechanical pump in an anaerobic operation or an airlift pump in an aerobic operation. The system includes an ecosystem such as microorganisms, benthic animals, and higher aquatic plants for the purification of the polluted water within the container, and a pump means to provide for the rapid recirculation of the polluted water within the container with the fine media as a fluidized bed, with a recirculation rate up to a thousand times the flow-through water rate, thereby providing for the rapid, efficient and effective purification of the polluted water.

22 Claims, 3 Drawing Sheets

ECOLOGICAL FLUIDIZED BED SYSTEM

REFERENCE TO PRIOR APPLICATIONS

This application is a divisional application of U.S. Ser. No. 08/149,964, filed Nov. 10, 1993, now U.S. Pat. No. 5,486,291.

BACKGROUND OF THE INVENTION

A wide variety of techniques and systems have been developed for the treatment and purification of polluted water, typically employing biologically active microorganisms and treating the polluted or waste water in various containers. Various forms of beds and biological filters have been used in the purification of water. One technique, for example, for removing pollutants from various types of waste water, is described in U.S. Pat. No. 5,087,353 issued Feb. 11, 1992, hereby incorporated by reference, wherein a solar aquatic apparatus is employed for treating waste water.

It is desired to provide for a new, effective and improved method for treating polluted or waste water, to reduce BOD and TSS, to provide rapid nitrification when used in an aerobic operation, to provide a high rate of denitrification when used in an anaerobic operation, to reduce levels of phosphorous, to enhance and accelerate other biological processes in the purification of the polluted or waste water such as a reduction in fats, oils, greases and to accelerate the breakdown of toxic materials using biological strategies and to reduce pathogen levels in the polluted water, to provide for a treated water.

SUMMARY OF THE INVENTION

The invention relates to a ecological fluidized bed system and method for the treatment and processing of polluted or waste water to provide a treated or purified water. In particular, the invention concerns the employment of an ecological fluidized bed containing a semi-buoyant, but not limited to, fine particulate media and rapidly recycling or recirculating the polluted water with the semi-buoyant fine media in a water treatment ecosystem within The bed, so as to substantially increase the exposure of the polluted water to the community of the ecosystem prior to discharge of the treated water.

The invention comprises an ecological fluidized bed system for the processing of polluted water to provide treated water, which system comprises a fluidized bed container, which may either be a fixed container or a flexible plastic bag-type container. The container contains a water-porous water filter layer of a coarse particulate media in the bottom of the container, arid which coarse media is typically not subject to substantial movement by water flow through the container due to its density, and optionally may contain a porous mesh or other barrier sheet material on the upper surface thereof. The container also includes a layer of, for instance, at rest, a fine particulate semi-buoyant media on or above the layer of coarse media, and which fine media material has a substantially neutral water buoyancy, for example, a specific gravity of 0.9 to 1.1, and is characterized by a high surface to volume ratio, for example, a surface area to volume ratio substantially greater than a smooth sphere. Typically the media would have a roughened type, non-smooth surface and having a variable particle size with generally a mean particle size of less than about one inch in diameter and subject to being admixed with, moved and recycled with the polluted water in the container to form a fluidized bed of the water and fine media, and, for example, may comprise, but not be limited to, porous-type pumice rock or the like.

The fine media, such as porous fine media like pumice rock, may be pre-impregnated with bacteria and nutrients and other ecosystem elements prior to admixture with the polluted water and recycling in the container.

The container also contains an inlet for the introduction of polluted water, generally into the coarse layer of the container, which polluted water substantially fills the container in operation and, for example, is introduced into the upper portion of the container and directed by a pipe to the coarse media layer. The container also includes an outlet, generally at the upper portion of the container, for the withdrawal. of treated water, with the polluted water introduced and the treated water withdrawn establishing a flow-through rate of the water in the ecological fluidized bed container. The container also contains an ecosystem means to treat the polluted water introduced and to provide treated water to be discharged. For example, organic matter, mineral and micronutrient, bacteria, fungi, protozoa, nematodes, benthic animals, mollusks, snails, higher plants, microorganisms, or a combination thereof, typically to provide a complete and balanced ecosystem for the treatment of the polluted water. The system also includes a pump means, typically in an aerobic operation an airlift pump and in an anaerobic operation a mechanical pump to provide for the rapid recycling and recirculation of the polluted water together with the fine media in the presence of the ecosystem in the container. The recycled or recirculation rate within the bed or container should be at least ten times the flow-through rate and typically more than 100 and up to about one thousand times the flow-through rate to increase substantially the exposure of the polluted water to the ecosystem community within the container, therefore providing for treating polluted water, including sewerage and industrial waste water, and for the purification of natural bodies of water, and drinking water reservoirs.

The ecological fluidized bed system provides for the employment of fine media material with high surface to volume ratio, and with the media and the polluted water together within a ecosystem rapidly recycled using the dispersed, semi-buoyant fine media as a fluidized bed within a container. It is important that high surface rates of exchange may be made within the ecological fluidized bed, since the purification rates of the polluted water are dependent on available surface area and the hydraulic flows with the fine media, together with the polluted water, so that rapid recirculation, for example, up to one thousand times the flow-through rate, is incorporated as a strategy for increasing the exposure of the polluted water to the community of microorganisms and other parts of the ecosystem to the fine media, typically a balanced ecosystem to treat the water to a desired level of treatment before discharge. The method provides for a stable, high surface area micro-environment site for the microorganisms and the other portions of the ecosystem. Also, rapid exchange across biological surfaces, direct ammonium and nitrate uptake, nitrification and denitrification cycles support higher plant life and root system within the media, and the aquatic environment in the ecological fluidized bed, and permits self-cleaning of the ecological fluidized bed through the introduction periodically of air or water, typically high-pressure air or water, in order to dislodge solid waste material from the coarse and fine media and to flush the material out the outlet of the bed.

The ecological fluidized bed system preferably employs a lower bottom layer coarse media material. This is optional, however, and the bed may be operated by employing only a fine media material. The fine and coarse media material may comprise a wide variety of particulate type material. The coarse layer material should be of larger size and not be subject to movement due to the high recirulation rate within the bed. The porous lower layer, for example, should have sufficient depth to permit the introduction of the polluted water into the coarse media layer at the bottom, and thus the coarse media layer may comprise heavy rocks, sand or other coarse media, heavy particulate material.

The container has an outlet generally at or near the top of the container for the removal of treated water. Where the fine media has a specific gravity of less than about 1, i.e., tends to be buoyant, a filter mesh material may be placed across the top of the container generally below the treated water outlet, so that treated water may be removed without fine media particles dispersed therein or a separate fine media filter used in the outlet. Typically, where the fine media does not tend to remain at the top of the water in the container, e.g. where the fine media has a specific gravity generally greater than 1.0, then after operation for a period of time, a layer of generally clear treated water will accumulate at the top of the container and the clear, treated water withdrawn through the outlet for recovery, further processing or further fluidized bed treatment.

The fine media material employed typically should have a density approaching about that of the polluted water, that is to be semi-buoyant to be easily recycled along with the polluted water and the ecosystem employed within the container. One preferred example is the employment of fine pumice rock, which has a rough surface area, is somewhat porous and typically has a mean particle size of one inch or less and generally from ¼ to 1½ inch, which has been found to have been satisfactory in certain ecological fluidized bed system operations. Sufficient of the fine media material is employed to permit the desired recycling with the polluted water and to provide the desired surface area with the selected recycle rate and recycle times. Typically, the amount of fine media material employed ranges from about 10 to 60, e.g. 20 to 50 percent of the volume of the water in the container. The fine and coarse media material may vary in materials, and may include rock material as well as plastic-type materials, however, materials having a rough surface area to give a high surface area to volume ratio are most desirable to provide for a surface for the attachment of microorganisms and other ecosystem materials. Also in the preferred configuration, the total balance ecosystem is employed in the polluted water and the fine and coarse media material, which may be the same material with the fine material, naturally buoyant or almost so in order that there is small movement within the media caused by the recycling of the water, with a preferred medium comprising pumice rock and other materials with a neutral or almost neutral buoyancy.

When the ecological fluidized bed is run as an aerobic operation, an efficient method of recycling the polluted water within the bed is an airlift pump, so that diffused air in a pipe draws water from the lower or the bottom part of the container and moves through the pipe and floods the area above the coarse medium. The airlift pump aerates the water and is an efficient method of moving large volumes while employing low hydraulic heads, and the aerobic operation allows the nitrification cycle to take place within the fluidized bed in the container.

When the ecological fluidized bed system is run in an anaerobic operation, a denitrification cycle takes place. In this operation, the ecological fluidized bed is called an up-flow denitrifier system. Employment of a mechanical pump within a sump enables the polluted water to be recycled within the fluidized bed container by rising up through the media. This up-flow system permits the nitrogen gas given off as part of the denitrification cycle to be carried to the top surface of the water in the container and to be discharged to the atmosphere. The avoidance of gas pockets within the media is thus helpful in this process. In the anaerobic operation, the fluidized bed should have minimized contact with air and may also include a cover with means to reduce contact with the air and provide an outlet to discharge nitrogen.

In both systems, plants can be grown on the surface of the ecological fluidized bed, in the fine or coarse media such as higher aquatic plants, with the plant roots penetrating the media to provide helpful additional substrates, while the plants also have the ability to take up nutrients and sequester metals from the water. In addition, it is useful to employ filter feeders such as clams and snails to grow on the uppermost level of the ecological fluidized beds. A fluidized bed of the system may be employed alone or in a series of parallel or series arrangements. For example, an individual ecological fluidized bed can be contained within a separate tank, as a cell within a lagoon-type structure, and also within a flexible film container in the form of a bag or a liner, with typically the top of the bag attached to a flotation collar to permit the flotation of the ecological fluidized bed in a body of water. The flexible bag container is filled with pumice rock or media along with suitable plumbing and pumping means. The whole arrangement is then floated in the body of water.

The water may simply act as a support system for the containment bag, or may be used for the on-site treatment of natural water bodies and waste treatment lagoons whereby the ecological fluidized bed may draw water from the surrounding body of water, purify and discharge the water back into the body of water. The employment of lagoon-type structures and or bag-type ecological bed systems allows for the economic deployment of large numbers of ecological fluidized beds as separate cells in a relatively inexpensive and easily managed form for the efficient and effective treatment of polluted water. The polluted water, which may be treated by the ecological fluidized bed system, may comprise a wide variety of waste water for all different conditions including sewerage and industrial waste water.

The invention will be described for the purposes of illustration only, in connection with certain embodiments, however, it is recognized that those persons skilled in the art may make various changes, modifications, additions and improvements to the illustrative embodiments without departing from the spirit and scope of the invention.

DESCRIPTION OF THE EMBODIMENTS

Figure 1:
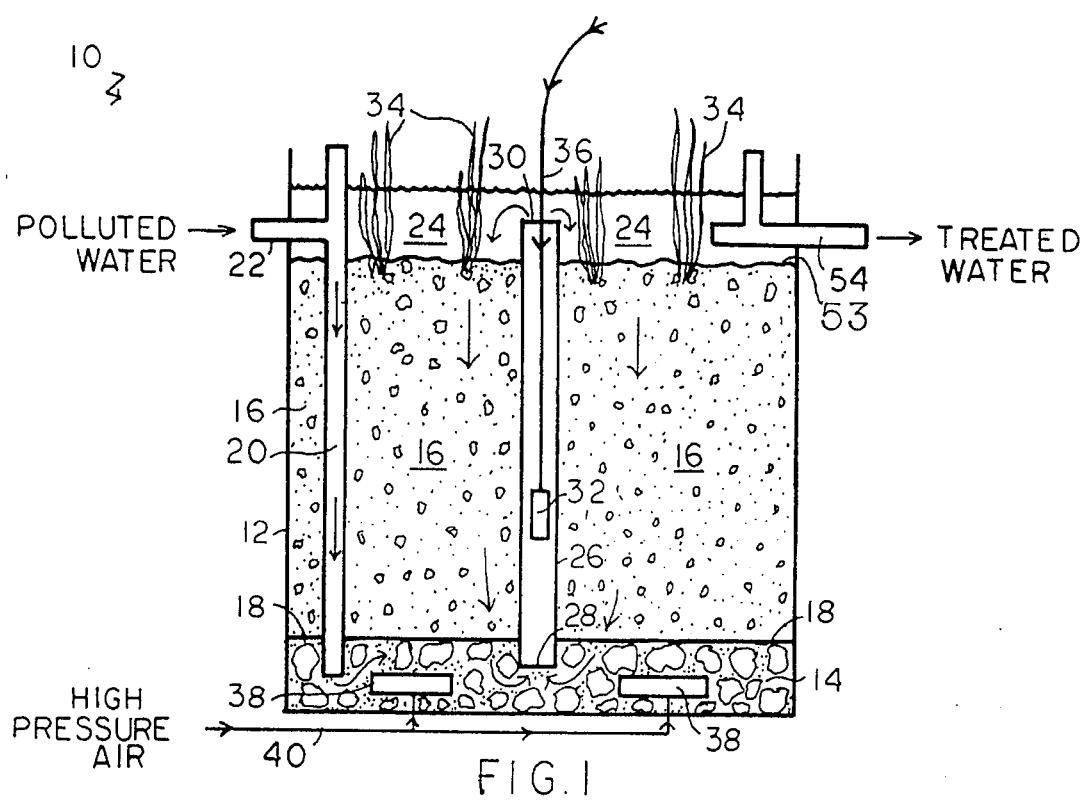
FIG. 1 is a schematic, illustrative sectional view of an aerobic ecological fluidized bed system of the invention.

FIG. 1 shows an aerobic ecological fluidized bed system 10 of the invention which comprises a container 12 with a layer of coarse medium 14 on the bottom of the container 12 such as a particulate porous rock-type material like pumice rock and the container 12 having therein a particulate, semi-buoyant fine medium material 16 such as finely divided ½ to 1½ inch pumice rock above the coarse media and dispersed in the water. The container includes a porous mesh barrier 18, typically of plastic, which separates the coarse media layer 14 from the fine media material 16. The container includes a generally upright water inlet pipe 20 having an inlet 22 for the introduction of polluted water into the inlet pipe, the inlet pipe extending into the coarse media layer 14 at the bottom of the container 10. The water 24 forms a top layer in the container 10. The container 10 includes pipe 26 which also contains the aerator for the airlift pump 32 which recirculates the water within the system of container 10. The airlift pipe 26 has a flow path 28 in the coarse media layer 14 and its upper part close to the surface of the water 24. The airlift aerator 32 is connected to a supply of air 36. The airlift pump means used comprises tube 26 and the aerator 32. The airlift pump works by creating a lighter water column in the pipe 26 of FIG. 1. This is achieved by blowing air through pipe 36 to an aerator 32. The fine bubbles in the water column in pipe 26 reduce the specific gravity of this water in relation to the rest of the water in the EFB. This causes water in pipe 26 to rise to the top 30 and so into 24 and down through 16. The system 10 includes aquatic-type plants 34 having roots disposed in the fine media 16 and then upwardly from the surface of the water 24 as part of the ecosystem used to treat the polluted water. The container 12 also contains aeration devices 38 in the coarse media layer and a high pressure air and/or water supply in line 40 so that high pressure air may be periodically introduced into the aerator 38 to dislodge waste material from the coarse and porous layer 14 and to discharge the solid waste material from the discharge line 54.

The coarse media layer 14 can be comprised of coarse rock or plastic media which minimizes the disruption to hydraulic flow, while the fine media 16 employed in the container 12 should have a high surface to volume ratio, that is, have a non-smooth surface or typically a rough surface and can be composed of plastic or natural materials with a specific gravity close to one, allowing movement of the fine media 16 with the hydraulic flow of the water to form an ecological fluidized bed. The rapid recirculation rate within the container 12 can be achieved by a single airlift pump 32 or multiple pumps may be employed within the same body of the media. The air may be supplied, for example, through line 36 by an air blower matched to the design of the airlift pump such as to allow maximum recirculation rate for a minimum flow of air. The ecological fluidized bed is bioaugmented with a variety of bacteria, fungi, protozoas, nematodes and the like and animals to provide a complete ecosystem for the treatment of the polluted water introduced into the inlet 22 and to provide treated water removed from the outlet 54 from the top water layer 24. Optionally, the higher plants 34 can be grown on the top surface with their roots extending into the fine media 16. The roots of the higher aquatic plants 34 provide sites for bacteria and the plants can take up nutrients and metals from the polluted water.

In operation, air is introduced through pipe 36 to the airlift aerator 32 and water is drawn from the area of the coarse media layer 14, then passes up through the pipe from the bottom outlet 28 through pipe 26 through to the water 24 at the top of the container. This water 24 then passes down through the fine media 16 back to the coarse media layer 14 and so back up by the airlift pump 32 to the pipe 26 so as to cause a rapid recirculation flow-through rate within the ecological fluidized bed. As polluted water is introduced through inlet 22 to the container 12 it displaces water within the container and so the treated water or effluent is discharged from outlet 54. The ecosystem 10 as described provides for an efficient, aerobic, ecological fluidized bed system and method.

Figure 2:
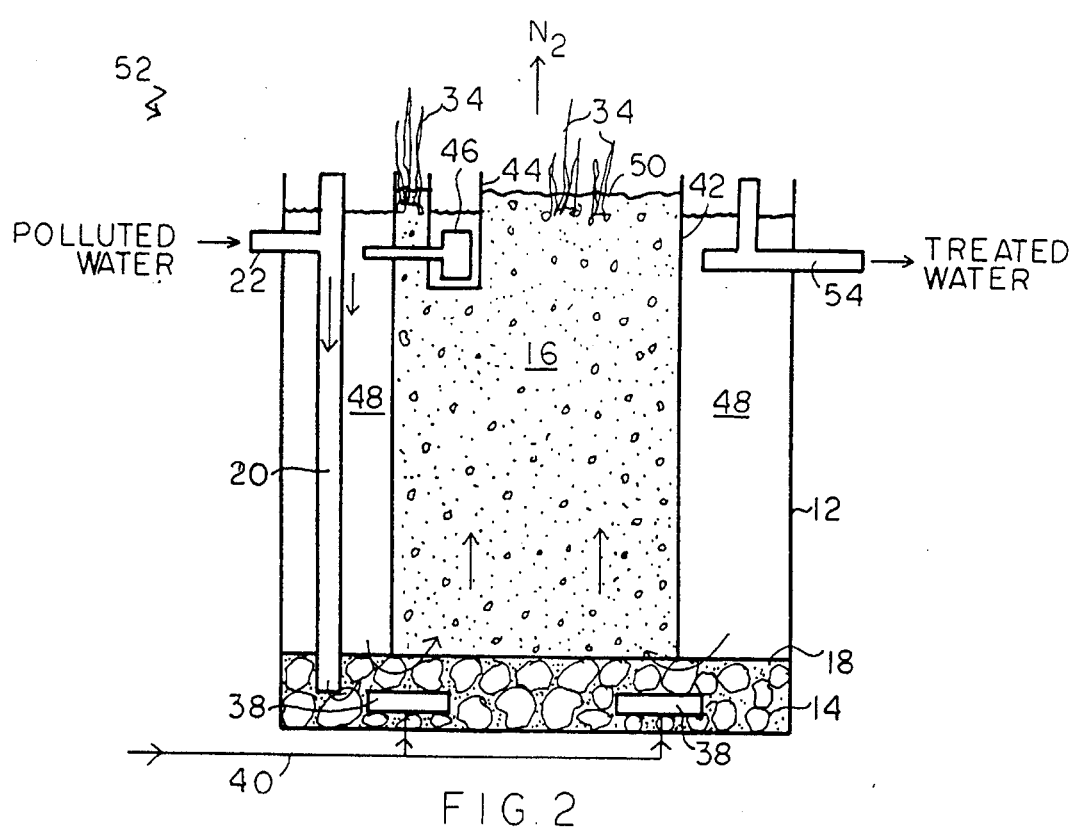
FIG. 2 is a schematic, illustrative sectional view of an anaerobic up-flowing ecological fluidized bed system of the invention.

FIG. 2 is directed to an anaerobic ecological fluidized bed system 52 of the invention, comprising a high rate bioreactor which biologically denitrifies polluted water. The anaerobic system 52 includes a cylinder 42 placed on top of the coarse layer 14 and includes a perforated sump area 44 in the upper portion of the fine media 16, and which perforated sump area includes a mechanical pump 46 having an outlet which is discharged into the water column 48 formed between the interior surface of the container 12 and the outer surface of the cylinder 42 and with the system containing a fine media and water, one to about 3 inches above the water level of the water in the outside water column 48. As in FIG. 1, the ecological fluidized bed system 52 can be bioaugmented with suitable minerals, bacteria, organic compounds and other biologicals to assist in the performance as a denitrifier, and plants 34 may be grown optionally on the surface of the fine media 16. The system 52 has limited exposure to the oxygen in the atmosphere and as desired the container 12 may be closed by a cover to reduced contact with the atmosphere and to provide for the discharge of nitrogen.

In operation, the mechanical pump 46 in the sump 44 pumps polluted water draining into the sump 44 from the fine media fluidized bed 16 into the water column 48 outside of the cylinder 42, which causes the polluted water introduced into inlet 22 to pass down under the bottom rim of the cylinder 42 and to flow out through the coarse media layer 14 and into the fine media ecological fluidized bed 16, then the water as treated in the ecological fluidized bed is then rapidly recycled into the perforated sump 44 to the mechanical pump 46 for recirculation at a high rate. Because polluted water passed up through the fine media 16, nitrogen and other gases given off in the treatment are carried to the surface 50 of the fluidized bed. In the anaerobic system 52 as described the process of denitrification is anaerobic, which allows the recirculating water within the ecological fluidized bed system 52 to operate without adding oxygen to the water.

Figure 3:
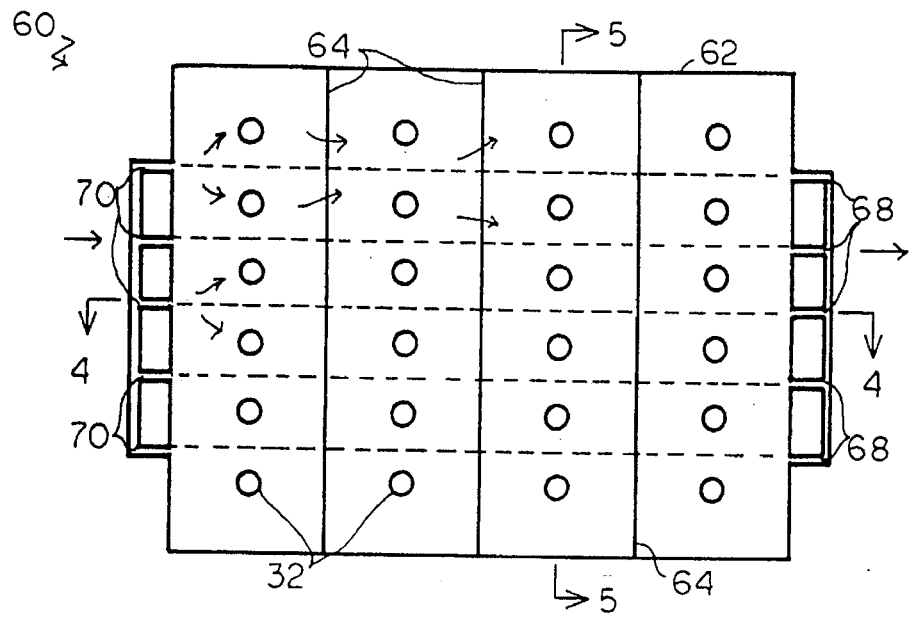
FIG. 3 is a schematic, illustrative top plan view of an ecological fluidized bed system in a lagoon configuration.
Figure 4:
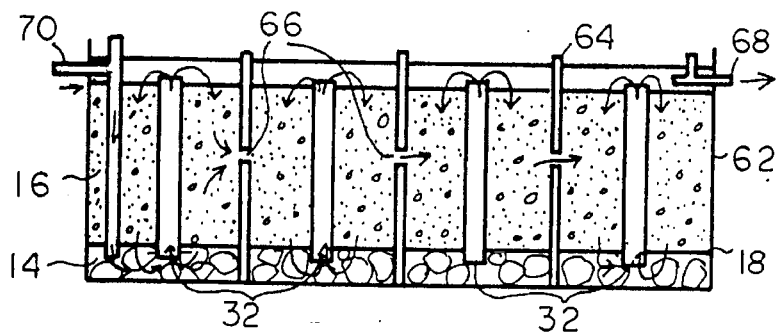
FIG. 4 is a sectionalized view of FIG. 3 along line 4—4.
Figure 5:
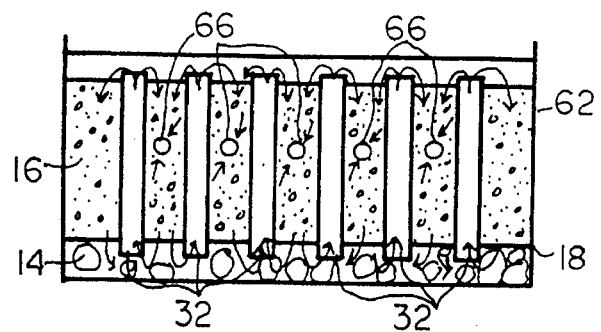
FIG. 5 is a sectionalized view of FIG. 3 along line 5—5.

FIGS. 3, 4, and 5 are directed to a lagoon-type system employing a plurality of ecological fluidized beds, for example, as shown in FIG. 1. Although the ecological fluidized bed (EFB) system 10 of FIG. 1 can be employed as a single unit, preferably a number of EFBs can be connected together. The size and number of the EFBs in the system will depend on the strength of the pollutants and the degree of treated water desired. In addition, the flow rate of recirculation of the polluted water within one or more of the EFB systems can be adjusted depending on the hydraulic flow through the total system and the level of pollutants in the polluted water. When the multiple EFB systems are employed, the connections can be done by normal pipe work and plumbing to connect the inlets and outlets. As illustrated more particularly in FIGS. 3, 4 and 5, multiple EFB systems may be constructed and employed within a lagoon. FIG. 3 being a top plan view showing a lagoon configuration with a plurality of EFBs joined with an airlift pump 32 for each EFB system, with the EFB systems both employed in series or parallel, showing a lagoon 62, with a barrier 64 across the lagoon to separate the EFB systems. Sectional views of the lagoon system 60 as shown along lines 4—4 and 5—5 of FIG. 3, illustrate, for example, the openings 66 between each of the connected EFB systems. FIG. 3 in particular shows a collection distribution header 70 for the collection of polluted water and directing the polluted water into the inlet of the plurality of EFB systems and a distribution header 68 for the collection and distribution of the polluted water which has been treated and the discharge of treated water form the lagoon system 60. In the lagoon system 60 there are optionally barriers 64 across the lagoon and these barriers allow for the pump flow of the polluted water as it passes through the barrier opening 66 between the EFB systems. The opening 66 may be a through passage without restriction or can be a valve which can be adjusted to provide for adjusted hydraulic flow to the polluted water between the various EFB systems. As the polluted water reaches the last cell or EFB system within the lagoon it is passed to a distribution header 68 as discharge. The ecology employed within the multiple EFB systems is similar to the single treatment described or may vary as desired. The lagoon system 60 as described and illustrated allows for an inexpensive way of utilizing a large number of the EFB systems in series and parallel to treat polluted or waste water in a lagoon.

The arrows shown in FIGS. 1 through 5 are to illustrate the water flow of the polluted water within the lagoon system 60.

Figure 6:
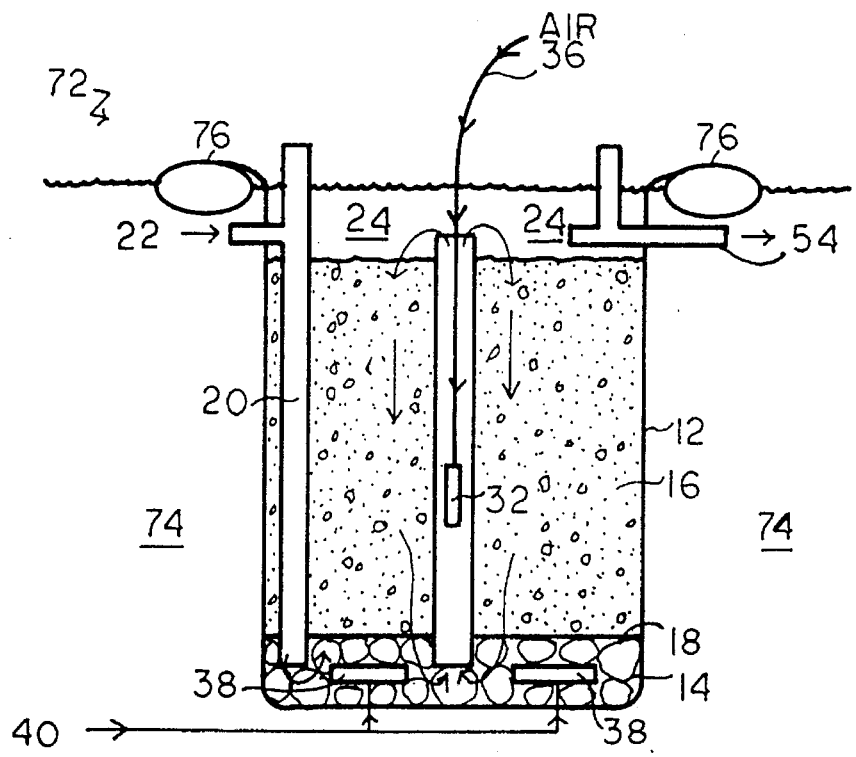
FIG. 6 is a schematic, illustrative, sectional view of a floating ecological fluidized bed system.
Figure 7:
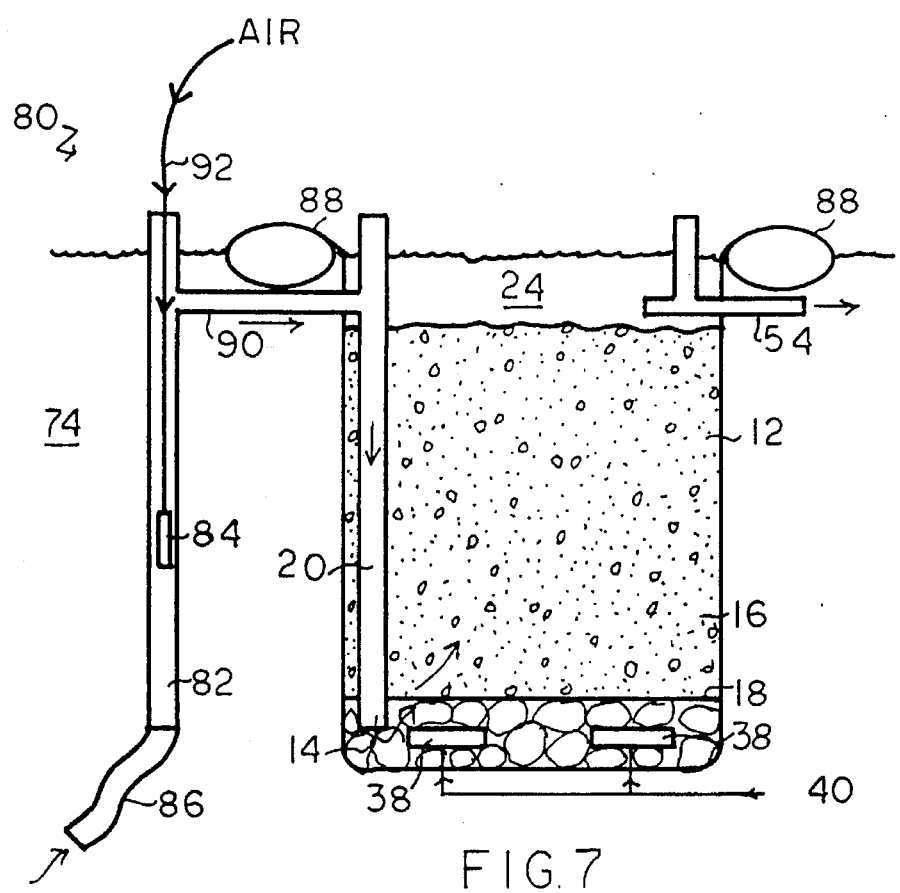
FIG. 7 is a illustrative, schematic sectional view of another floating, ecological fluidized bed system.

With reference to FIGS. 6 and 7 are illustrated in FIG. 6 a floating EFB system 72 of the EFB system of FIG. 1, wherein the container comprises a flexible bag 12 and the system includes a flotation collar 76 on the upper level thereof, which floats the EFB system in a polluted body of water 74. In this type of system 72 a flotation collar supports in particular an EFB system in a body of water, whether as an aerobic or anaerobic system (see FIGS. 1 and 2). A body of water 74 can act simply as a support medium for the particular one or more EFB systems in the body of water, which results in an inexpensive method of containment as there is a minimal need for a physical structure, since a flexible bag 12 with a flotation collar 76 is all that is required to support the EFB treatment system within the body of water. The influent pipe work can be connected to a polluted body of water or to one or more EFB systems in a series or parallel. If desired, the floating EFB systems can then be connected in a floating arrangement by attached ropes. In FIG. 6 in operation water is directed into the inlet 22. The airlift pump aerator 32 takes air from air source 36 as in the operation of FIG. 1, the treated water is recirculated and can then be discharged through discharge 54 either to another EFB system not shown or to the body of water 74.

Another flotation EFB system 80 is illustrated in FIG. 7, which includes an inlet pipe 82 containing an airlift pump aerator 84 in the inlet pipe with the air introduced through an air supply line 92 extending above the surface of the body of water 74 which air inlet pipe 82 contains a flexible plastic inlet tube 86 to draw polluted water From a body of water 74 into an inlet pipe 82 for introduction as polluted water in the inlet 90 and into the EFB aerobic bed system of FIG. 1, wherein the EFB system is floated in the body of water through the employment of collar-type floats 88.

The EFB systems are particularly useful for treating polluted water which may give off dangerous gases in treatment. The entire EFB system is then housed in a sealed container, which may be of a rigid or flexible material and the toxic gases can then be exhausted through pipes or through biological or activated carbon filters or the equivalent therein (not shown) to limit air pollution.

The EFB systems employed in a series or parallel might be employed around a floating barge which has a source of power and these clusters of EFB systems then can be anchored in rivers, canals, lakes and ponds, and in ocean or marine configurations for treating high volumes of polluted water with minimal energy. The power supply typically may be from wind generators and solar panels which charge battery banks to power electric blowers for the airlift pumps or may be conventional power supplies, and may be used to power the mechanical pumps for anaerobic configuration EFB systems. Or alternatively, wind power can be used to charge a pneumatic cylinder which stores compressed air for use in the airlift pump. The floating EFB systems can also be contained in extra-long, flexible containers, which with suitable flotation columns can treat extremely large volumes of water using media with specific gravity of close to 1 and flexible pipe work as described and illustrated in connection with FIGS. 1 and 2. The flexible wall containers can also be housed in a ditch or trough.

As described and illustrated, the ecological fluidized bed systems provide for the rapid, efficient treatment of polluted water to a treated water state through the employment of a dispersion of fine media particles, typically semi-buoyant and in the presence of an ecosystem to treat the polluted water and then rapidly recycling and recirculating the fine media with the water in the ecosystem in a fluidized bed arrangement to provide very efficient exposure to the large surface area of the fine media with flow rates up to about 100 times the flow-through of the water in the bed system.

What is claimed is:

1. An ecological fluidized bed system for the treatment of polluted water to provide treated water, which system comprises:

a) a housing having separate adjacent first and second chambers, said first and second chambers connected to permit the flow of circulated polluted water in the housing between said first and second chamber;

b) an inlet in said first chamber to introduce into said first chamber polluted water to be treated at an inlet flow-through rate, said first chamber having circulated, polluted water to be treated and essentially free of particulate media;

c) an inlet in said second chamber to introduce polluted water to be treated into said second chamber, and an outlet in said first chamber to discharge polluted water into said second chamber;

d) said second chamber comprised of polluted water, particulate media having a specific gravity of about 0.9 to 1.0 and an ecosystem means to treat the polluted water;

e) an outlet to withdraw treated water from the housing essentially free of particulate media;

f) circulating means to circulate polluted water between said first and second chambers at a high circulation flow rate of at least ten times the inlet flow-through rate of the polluted water into said first chamber; and g) means to introduce polluted water at an inlet flow-through rate into the inlet of said first chamber.

2. The system of claim 1 wherein said first chamber comprises a generally vertical airlift pipe having a first bottom inlet end and second top outlet end in the housing and the circulating means comprises an aerator means in the airlift pipe to provide an upward flow of aerated polluted water within the airlift pipe to draw in polluted water at the first bottom inlet end and to discharge aerated polluted water at the second top outlet end into said second chamber.

3. The system of claim 2 wherein the first bottom inlet end of the airlift pipe extends within a layer of coarse filter media in the bottom of the housing and the second top outlet end of the airlift pipe is in a top layer of treated water.

4. The system of claim 1 which includes a layer of coarse filter media at the bottom of the housing to filter the polluted water introduced into the inlet of said first chamber.

5. The system of claim 4 which includes means to introduce high pressure air or water into the layer of coarse filter media to dislodge waste material from the layer.

6. The system of claim 4 which includes mesh means on top of the layer of coarse filter media to retain the filter media.

7. The system of claim 4 which includes mesh means in the upper portion of said second chamber to retain particulate media within said second chamber.

8. The system of claim 1 wherein the circulating means comprises a mechanical pump in a sump within said second chamber to pump polluted water from said second chamber essentially free of particulate media into said first chamber.

9. The system of claim 1 wherein the particulate media in said second chamber has a mean particle size of greater than about ¼ inch.

10. The system of claim 1 wherein the circulating means provides a circulation flow rate of about 10 to 1000 times the inlet flow-through rate.

11. The system of claim 1 which includes aquatic plants in the upper portion of said second chamber with roots in the polluted water, particulate media and ecosystem means.

12. The system of claim 1 wherein the particulate media comprises pumice stone having a mean particle size of about ¼ to 1½ inches.

13. The system of claim 1 which includes a plurality of interconnected housings for the sequential treatment of polluted water.

14. The system of claim 1 wherein the housing comprises a plastic bag and a flotation means to float the plastic bag in a lagoon with the water in the lagoon as a source of he polluted water to be treated.

15. The system of claim 1 wherein said second chamber comprises a cylinder having a first bottom end, and a second top end within the housing and includes a sump and a mechanical pump in the sump as a circulating means, said first chamber surrounding said second chamber, and the system having means to maintain said second chamber under anaerobic conditions.

16. The system of claim 15 wherein the bottom end of the cylinder is located on a layer of coarse filter media on the bottom of the housing and the pump means and sump are in the upper portion of the second chamber.

17. The system of claim 1 wherein the particulate media comprises about 10 to 60 percent by volume of the second chamber.

18. The system of claim 1 wherein the inlet to said first chamber or said second chamber comprises a pipe extending to the bottom of the housing.

19. The system of claim 1 wherein said second chamber surrounds said first chamber and the outlet to withdraw treated water extends into an upper layer of treated water in said second chamber.

20. The system of claim 1 wherein said first chamber surrounds said second chamber and the outlet to withdraw treated water extends into an upper layer of treated water in said first chamber.

21. An ecological fluidized bed system for the treatment of polluted water to provide treated water, which system comprises:

a) a housing having separate adjacent first and second chambers, said first and second chambers connected to permit the flow of circulated polluted water in the housing between said first and second chamber;

b) an inlet means, which means comprises a pipe extending to the bottom of the housing in said first chamber, wherein said first chamber comprises a generally vertical airlift pipe having a first bottom end and second top end in the housing to introduce into said first chamber at an inlet flow-through rate filtered polluted water to be treated, said first chamber essentially free of particulate media;

c) an inlet means for said second chamber which comprises a pipe for the introduction of polluted water to be treated into the bottom of said second chamber;

d) a layer of coarse filter media at the bottom of the housing to filter the introduced polluted water;

e) said second chamber comprising about 10 to 60 percent by volume of particulate media, having a specific gravity of about 0.9 to 1.0, and a mean particle size of greater than about ¼", and an ecosystem means to treat the filtered circulated polluted water in said second chamber;

f) an outlet to withdraw treated water from the housing essentially free of particulate media;

g) circulation means to circulate polluted water between said first and second chamber wherein the circulating means comprises an aerator means in the airlift pipe to provide an upward flow of aerated polluted water within the airlift pipe to draw in filtered polluted water at the first bottom end and to discharge aerated polluted water at the second top end into said second chamber, at a circulation flow rate of about ten to one-thousand times the inlet flow-through rate of the polluted water; and h) means to introduce polluted water at an inlet flow-through rate into the inlet means of said first chamber.

22. An ecological fluidized bed system for the treatment of polluted water to provide treated water, which system comprises:

a) a housing having separate adjacent first and second chambers, said first and second chambers connected to permit the flow of circulated polluted water in the housing between said first and second chamber;

b) a layer of coarse filter media at the bottom of the housing to filter polluted water introduced into the filter media prior to entry into said first chamber, and the inlet of said second chamber within the filter media;

c) an inlet in said first chamber to introduce into said filter media at the bottom of said first chamber at an inlet flow-through rate polluted water to be treated, said first chamber essentially free of particulate media;

d) an inlet in the bottom of said second chamber to introduce filtered polluted water to be treated into said second chamber;

e) said second chamber comprising polluted water and particulate media wherein the particulate media in said second chamber has a specific gravity of about 0.9 to 1.0, and a mean particle size of greater than about ¼ inch, and an ecosystem means to treat the polluted water;

f) an outlet to withdraw treated water from said first chamber essentially free of particulate media;

g) means to circulate polluted water between the inlet of said first chamber and the outlet of said second chamber, wherein the circulating means comprises a mechanical pump in a sump within said second chamber to pump polluted water from said second chamber essentially free of particulate media by a pump outlet into said first chamber at a high circulation flow rate of at least ten times the inlet flow-through rate of the polluted water in said first chamber;

h) said second chamber comprised of a cylinder having a first bottom end and second top end within the housing, said first chamber surrounding said second chamber, and means to maintain said second chamber under anaerobic conditions; and i) means to introduce polluted water at an inlet flow-through rate into the inlet of said second chamber.

* * * * *